(12) United States Patent
Nguyen et al.

(10) Patent No.: US 12,381,386 B2
(45) Date of Patent: Aug. 5, 2025

(54) SYSTEMS AND METHODS FOR A POWER-LINE FILTER UTILIZING CONDUCTIVE CONCRETE/SHOTCRETE

(71) Applicant: NUtech Ventures, Inc., Lincoln, NE (US)

(72) Inventors: Lim Nguyen, Lincoln, NE (US); Christopher Tuan, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 1147 days.

(21) Appl. No.: 16/623,293

(22) PCT Filed: Jun. 15, 2018

(86) PCT No.: PCT/US2018/037914
§ 371 (c)(1),
(2) Date: Dec. 16, 2019

(87) PCT Pub. No.: WO2018/232351
PCT Pub. Date: Dec. 20, 2018

(65) Prior Publication Data
US 2020/0176977 A1    Jun. 4, 2020

Related U.S. Application Data

(60) Provisional application No. 62/577,103, filed on Oct. 25, 2017, provisional application No. 62/521,010, filed on Jun. 16, 2017.

(51) Int. Cl.
*H02H 1/04* (2006.01)
*C04B 14/02* (2006.01)
(Continued)

(52) U.S. Cl.
CPC ........... *H02H 9/005* (2013.01); *C04B 14/022* (2013.01); *C04B 28/02* (2013.01); *H01B 1/18* (2013.01); *C04B 2111/94* (2013.01)

(58) Field of Classification Search
CPC ................... H02H 9/005; H01B 1/18
(Continued)

(56) References Cited

U.S. PATENT DOCUMENTS

| 3,903,353 | A | * | 9/1975 | Pirooz | C03C 3/064 |
| | | | | | 174/68.3 |
| 7,045,716 | B2 | * | 5/2006 | Granheim | H05B 3/56 |
| | | | | | 174/110 R |

(Continued)

FOREIGN PATENT DOCUMENTS

| CN | 102219459 A | 10/2011 |
| WO | 2017018155 A1 | 2/2017 |

OTHER PUBLICATIONS

International Search Report and Written Opinion for PCT/US2018/037914 mailed Oct. 2, 2018.

*Primary Examiner* — Jared Fureman
*Assistant Examiner* — Lucy M Thomas
(74) *Attorney, Agent, or Firm* — Leydig, Voit & Mayer, Ltd.

(57) ABSTRACT

An electrical filter is disclosed. The electrical filter can include a conductive concrete structure including at least one of a conductive carbon material, a magnetic material, or a conductive metallic material. The conductive concrete structure is characterized by an electrical conductivity greater than 0.5 siemens per meter. The electrical filter also includes at least one electrical cable disposed within the conductive concrete structure. The at least one electrical cable includes an input to receive an electrical signal and an output to output an attenuated electrical signal.

12 Claims, 9 Drawing Sheets

(51) Int. Cl.
  *C04B 28/02* (2006.01)
  *H01B 1/18* (2006.01)
  *H02H 9/00* (2006.01)
  *C04B 111/94* (2006.01)
(58) Field of Classification Search
  USPC .......................................................... 361/110
  See application file for complete search history.

(56) References Cited

U.S. PATENT DOCUMENTS

| | | |
|---|---|---|
| 9,278,887 B1 | 3/2016 | Tuan et al. |
| 2002/0182395 A1* | 12/2002 | Svedberg .............. E04F 21/244 |
| | | 106/644 |
| 2007/0105445 A1* | 5/2007 | Manto .................. H05K 9/0084 |
| | | 439/620.09 |
| 2013/0201647 A1 | 8/2013 | Lind et al. |
| 2014/0102750 A1 | 4/2014 | Nadakal et al. |
| 2014/0326478 A1* | 11/2014 | Maioli ..................... H02G 9/04 |
| | | 264/261 |
| 2016/0234977 A1* | 8/2016 | Tuan ....................... B28B 23/02 |
| 2017/0370693 A1* | 12/2017 | Klooster ............. G01M 5/0083 |
| 2019/0180065 A1* | 6/2019 | Babakhani ......... G06K 19/0708 |

* cited by examiner

SYSTEMS AND METHODS FOR A POWER-LINE FILTER UTILIZING CONDUCTIVE CONCRETE/SHOTCRETE

CROSS-REFERENCE TO RELATED APPLICATIONS

This application is a national stage of, and claims priority to, Patent Cooperation Treaty Application No. PCT/US2018/037914, filed on Jun. 15, 2018, which application claims the benefit of U.S. Provisional Application No. 62/521,010, filed Jun. 16, 2017 and U.S. Provisional Application No. 62/577,103, filed Oct. 25, 2017. The entire disclosures of the applications referenced above are incorporated by reference.

FIELD

The present disclosure relates to electromagnetic signal attenuation, and more specifically to an electrical filter.

BACKGROUND

Protection of electronic devices and electronic assets from electromagnetic (EM) threats is of continued importance. EM threats include lightning and solar storms, EM pulse (EMP) and electronic eavesdropping (TEMPEST). Typically, modern electronics operate at low voltage levels making them vulnerable to abrupt power surges. A sudden and intense EMP pulse—as fast as nanoseconds rise time and field strength as high as 50 kV/m—such as a high-altitude EMP (HEMP) event, could disable, damage, or destroy power grids, unprotected electrical devices, equipment, and controls for key services and infrastructures over a wide area. Lightning strikes, solar flares, or geomagnetic storms can produce similar catastrophic results. EMP can also be produced by high-powered, weaponized EM field generating devices.

HEMP events can damage electrical and electronic equipment via direct coupling of the intense radiated EM energy to the equipment. The radiated EM field can also induce high energy pulses coupled onto power lines and signal cables with peak currents as high as 2.5 kA over 500 ns FWHM (full width half max) and 20 ns rise time, causing damage to the connected equipment. HEMP protection of equipment is achieved by use of a shielded enclosure to prevent damage due to direct radiation, plus electrical filters to remove induced current pulses from electrical cables penetrating the enclosure at the points of entry (POE). The filters should reduce the high induced currents to a low residual level of normally less than 10 A peak. The HEMP shielded enclosure and filters should be compliant with the requirements of MIL-STD-188-125-1 or Def-Stan-59-188 part 1.

TEMPEST filters are used to prevent eavesdropping of confidential information. Similar to HEMP protection, a shielded enclosure prevents EM emission of intelligent signals, which may be picked up by an eavesdropper. A TEMPEST filter on electrical cables penetrating the shielded envelope can prevent intelligence signals that may be superimposed on the cables from conducting out of the shielded enclosure and resulting in unauthorized interception. A HEMP filter would typically have an insertion loss of 100 dB from 14 kHz to 10 GHz for TEMPEST performance.

Traditional filtering methods for power lines and signal cables at the POE of a shielded enclosure require high quality components in multi-stage filter design, resulting in expensive filter banks—especially for multiple power lines under high voltage and current. Furthermore, surge protectors, such as metal oxide varistors (MOV), suffer from cumulative degradation from peak current surges, which shortens life expectancy, leading to catastrophic failures as a protection device against EMP events.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In an example, an electrical filter is disclosed. The electrical filter can include a conductive concrete structure including at least one of a conductive carbon material, a magnetic material, or a conductive metallic material. The conductive concrete structure is characterized by an electrical conductivity greater than 0.5 siemens per meter. The electrical filter also includes at least one electrical cable disposed within the conductive concrete structure. The at least one electrical cable includes an input to receive an electrical signal and an output to output an attenuated electrical signal.

In other features, the conductive concrete structure is characterized by attenuation characteristics including a length of the conductive concrete structure, an attenuation coefficient of the conductive concrete structure, and an attenuation coefficient density of the conductive concrete structure.

In other features, the one or more attenuation characteristics are selected such that the electrical signal is attenuated by at least three decibels (3 dB).

In other features, the electrical filter further includes a connector disposed on an exterior surface of the conductive concrete structure and configured to connect to the at least one electrical cable.

In other features, the conductive concrete structure includes the conductive carbon material, the magnetic material, and the conductive metallic material. The conductive carbon material is present in an amount from fifteen percent (15%) to twenty percent (20%) of a conductive concrete mixture by weight, the magnetic material is present in an amount from twenty-five percent (25%) to fifty-five percent (55%) of the conductive concrete mixture by weight, and the conductive metallic material is present in an amount from five percent (5%) to ten percent (10%) of the conductive concrete mixture by weight.

In other features, the at least one electrical cable is in contact with the conductive concrete structure along a length of the at least one electrical cable.

In other features, the electrical filter includes a conduit disposed within the conductive concrete structure, and the conduit is configured to receive the at least one electrical cable.

In other features, the conduit is at least one of a polyvinyl chloride (PVC) pipe or a metal pipe.

In other features, the electrical conductivity of the conductive concrete structure is within a range from 0.5 siemens per meter to 5 siemens per meter.

In an example, an electrical filter is disclosed. The electrical filter includes a conductive concrete structure including at least one of a conductive carbon material, a magnetic material, or a conductive metallic material. The conductive concrete structure is characterized by an electrical conductivity greater than 0.5 siemens per meter. The electrical filter also includes at least one electrical cable having inductive coiling and being disposed within the conductive concrete structure. The at least one electrical cable includes an input to receive an electrical signal and an output to output an attenuated electrical signal.

In other features, the conductive concrete structure is characterized by attenuation characteristics including a length of the conductive concrete structure, an attenuation coefficient of the conductive concrete structure, and an attenuation coefficient density of the conductive concrete structure.

In other features, the one or more attenuation characteristics are selected such that the electrical signal is attenuated by at least three decibels (3 dB).

In other features, the electrical filter further includes a connector disposed on an exterior surface of the conductive concrete structure and configured to connect to the at least one electrical cable.

In other features, the at least one electrical cable is in direct contact with the conductive concrete structure along an entire length of the at least one electrical cable.

In other features, the electrical circuit further includes a conduit disposed within the conductive concrete structure, and the conduit is configured to receive the at least one electrical cable.

In other features, the conduit is at least one of a polyvinyl chloride (PVC) pipe or a metal pipe.

In other features, the electrical conductivity of the conductive concrete structure is in a range from 0.5 siemens per meter to 5 siemens per meter.

In an example, a system is disclosed. The system includes a first electromagnetic pulse structure that at least partially encloses a first electronic device, a second electromagnetic pulse structure that at least partially encloses a second electronic device, and an electrical filter. The electrical filter includes a conductive concrete structure formed from a conductive concrete mixture including at least one of a conductive carbon material, a magnetic material, and a conductive metallic material. The conductive concrete structure is characterized by an electrical conductivity greater than 0.5 siemens per meter. The electrical filter also includes at least one electrical cable disposed within the conductive concrete structure. The at least one electrical cable includes an input to connect to the first electronic device and an output to connect to the second electronic device.

In other features, the first electromagnetic pulse structure is formed from the conductive concrete mixture, and the second electromagnetic pulse structure is formed from the conductive concrete mixture.

In other features, the at least one electrical cable is arranged in at least one loop within the conductive concrete structure.

In other features, the first electronic device comprises at least one of a transformer or a server.

In other features, the electrical conductivity of the conductive concrete structure is in a range from 0.5 siemens per meter to 5 siemens per meter.

In an example, a method is disclosed. The method includes forming a frame that is configured to receive a conductive concrete mixture, placing at least one electrical cable within the frame, and within the frame, adding the conductive concrete mixture to form a conductive concrete structure that covers the at least one electrical cable. The conductive concrete mixture includes at least one of a conductive carbon material, a magnetic material, or a conductive metallic material such that the conductive concrete structure is characterized by an electrical conductivity greater than 0.5 siemens per meter.

In other features, the method also includes placing a conduit within the frame prior to adding the conductive concrete mixture and placing a non-empty set of the at least one electrical cable within the conduit.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The Detailed Description is described with reference to the accompanying figures. The use of the same reference numbers in different instances in the description and the figures may indicate similar or identical items.

DETAILED DESCRIPTION

The present disclosure is directed to a conductive concrete structure that includes one or more electrical cables. The conductive concrete structure functions as a filter, such as an EMP filter, by using the absorption property of conductive concrete. For example, electrical cables are embedded within the conductive concrete structure to form a lossy transmission line structure. Energy generated by an EMP event that is propagating on the electrical cables dissipates and is absorbed by the conductive concrete surrounding. Based upon the length of the conductive concrete structure, a pulse characteristic due to the EMP event can be reduced to a level that no longer poses a threat to the protected equipment.

Figure 1:
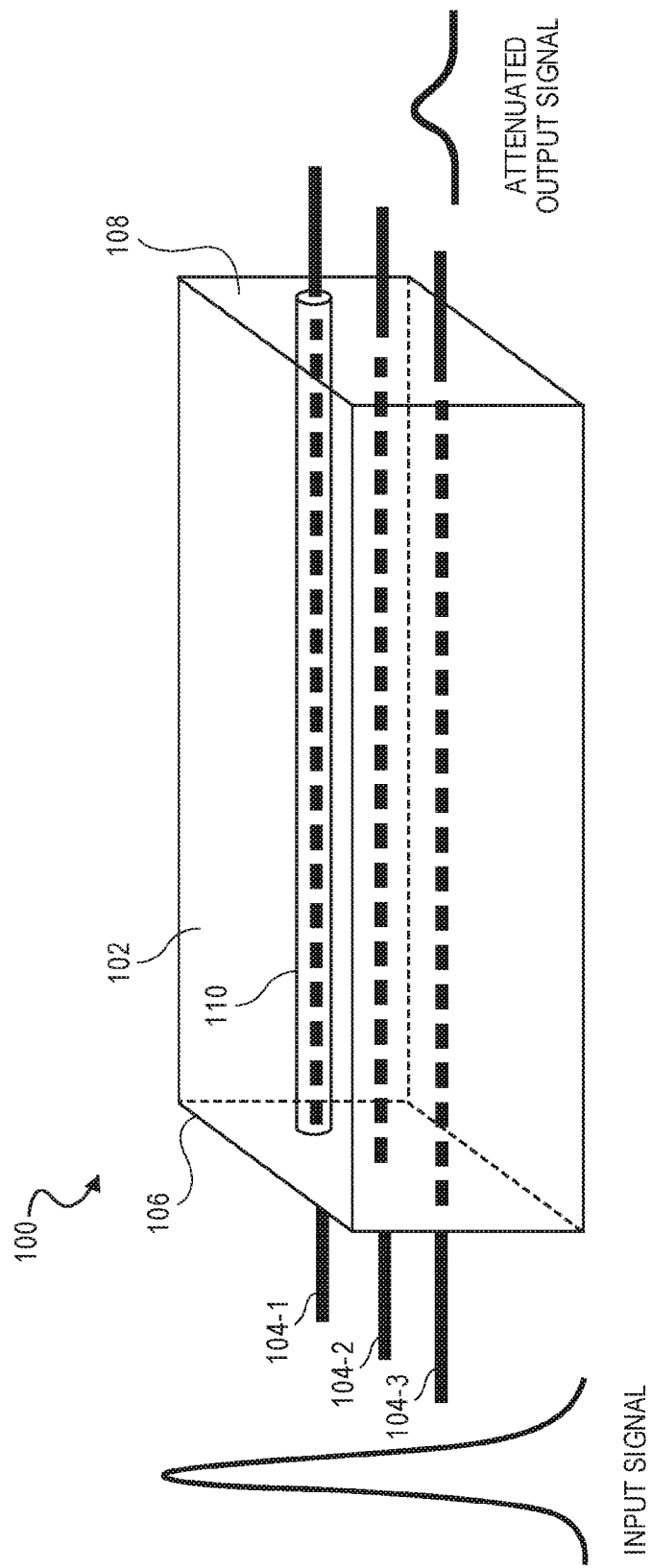
FIG. 1 is a diagrammatical illustration of a filter according to an example implementation of the present disclosure.

FIG. 1 illustrates an example implementation of an electrical filter 100. The electrical filter 100 includes a conductive concrete structure 102 having one or more electrical cables, which are illustrated as electrical cables 104-1, 104-2, 104-3 (collectively, electrical cables 104), disposed therein. In various implementations, the electrical cables can include coaxial cables, twisted-pair cables, stranded cables, solid cables, or the like. The electrical cables include suitable cables that can transmit electrical signals, such as data signals or power signals.

In an example implementation, the electrical cables include at least three (3) electrical power cables representing three phases. The conductive concrete structure 102 can be cast as an in-ground trench for grounding purposes.

The conductive concrete structure 102 includes a conductive concrete mixture that is configured to provide EMP shielding and reflect and/or absorb EM waves propagating through the conductive concrete mixture. The conductive concrete mixtures include cement, water, conductive carbon material, magnetic material, and conductive metallic material. The conductive carbon material may include conductive carbon particles, conductive carbon powder, and/or coke breeze. The conductive metallic material may include steel fibers. The magnetic material may include taconite and/or iron silicate sand. The conductive concrete mixture may also include graphite powder, silica fume, and/or other supplementary cementitious materials (SCM) such as fly ash, calcined clay, and ground granular blast furnace slag (GGBFS). The conductive carbon material is present in the mixture in an amount up to about forty percent (40%) of the conductive concrete mixture by weight. The magnetic material is present in the mixture in an amount up to about seventy-five percent (75%) of the conductive concrete mixture by weight. The conductive metallic material is present in the mixture in an amount up to about fifteen percent (15%) of the conductive concrete mixture by weight.

In some implementations, the conductive carbon material may be present in the mixture in an amount from about fifteen percent (15%) to about twenty percent (20%) of the conductive concrete mixture by weight, the magnetic material may be present in the mixture in an amount from about twenty-five percent (25%) to about fifty-five percent (55%) of the conductive concrete mixture by weight, and the conductive metallic material may be present in the mixture in an amount from about five percent (5%) to ten about percent (10%) of the conductive concrete mixture by weight.

In various implementations, the conductive concrete mixture may include one or more magnetic materials, such as a ferromagnetic material, a paramagnetic material, and so forth, which serve to provide EMP shielding and absorb EM waves propagating through the conductive concrete structure 102. For example, the conductive concrete mixture includes a taconite rock material that includes magnetite, such as a taconite aggregate. However, taconite aggregate is provided by way of example only and is not meant to limit the present disclosure. Thus, in other implementations, the conductive concrete mixture may include other materials, such as, but not limited to natural geological materials such as iron silicate sand, mineral materials, and so forth. For example, the conductive concrete mixture may include meteoric iron (e.g., iron from nickel-iron meteorites) having kamacite and/or taenite minerals. The conductive concrete mixture may also include magnetite crystals produced by bacteria and/or magnetite collected from river or beach sands. Further, the conductive concrete mixture may include titanohematite and/or pyrrhotite (which may be ground into a powder). In still further instances, the conductive concrete mixture may include a paramagnetic mineral, such as ilmenite, titanomagnetite, and so forth.

The conductive concrete mixture also includes one or more conductive materials configured to furnish electrical conductivity to the concrete. The conductive material serves to provide EMP shielding and reflect and absorb EM waves propagating through the conductive concrete mixture. For example, the conductive concrete mixture may include at least substantially uniformly distributed conductive materials, which may include metallic and possibly non-conductive metallic materials, such as metal and/or carbon fibers. In implementations, the conductive metallic material may serve to reflect EM waves, while the non-conductive metallic material may serve to absorb EM waves. For the purposes of the present disclosure, a conductive concrete mixture may be defined as a cement-based admixture containing electrically conductive components that furnish a relatively high electrical conductivity to the concrete (that is, with respect to the electrical conductivity of typical concrete).

The conductive concrete mixture may include conductive carbon particles, such as carbon powder, and so forth, which may furnish electrically conductive paths between portions of the conductive material, achieving, for instance, an effective reflective-wire-mesh structure in the concrete. In some implementations, graphite and carbon granules are used with the conductive concrete mixture. These granules can have sizes up to 9.525 millimeters (three-eighths of an inch (3/8 in.)) as measured by sieve analysis with ten millimeter (10 mm) to two-tenths of a millimeter (0.2 mm) mesh sizes, and so forth. In some implementations, a baked carbon additive is used with the conductive concrete mixture. In some implementations, a graphite carbon additive is used with the conductive concrete mixture.

In implementations, the conductive concrete mixture includes a conductive metallic material. For example, the conductive metallic material may be a steel material (e.g., bare steel, galvanized steel) or a combination of steel materials, such as 25.4 millimeters (one inch (1 in.)) long steel fibers, one and 38.1 millimeters (one and one-half inch (1.5 in.)) long steel fibers, fine steel fibers, steel wool fibers, steel powder, and so forth. In some implementations, low carbon steel fibers having aspect ratios from about eighteen (18) to fifty-three (53) can be used to form the conductive concrete mixture. These fibers may be rectangular in cross-section and may have a deformed and/or corrugated surface to aid in bonding with the concrete material. For example, low carbon, cold drawn steel wire fibers having variable equivalent diameters and a continuously deformed shape can be used. The steel wire fibers can have various lengths (e.g., about thirty-eight millimeters (38 mm), about fifty millimeters (50 mm), and so forth) and/or aspect ratios (e.g., about thirty-four (34), about forty-four (44), and so on). In some implementations, steel fibers are used that have lengths from about thirteen millimeters (13 mm) to fifty millimeters (50 mm).

It should be noted that the steel fibers can have various shapes, including, but not limited to: straight, wavy, end-deformed, and so forth. In various implementations, the steel fibers used meet the ASTM A820 specifications. Further, steel fibers are provided by way of example only and are not meant to limit the present disclosure. Thus, other conductive metallic materials may also be utilized, including metal particles, such as steel shavings, which may have varying diameters. In some implementations, fine steel wool fibers and/or powder having a size of about six-tenths of a centimeter (0.6 cm) is used with the conductive concrete mixture. Further, conductive metallic strands and/or coils can be used. Additionally, the conductive concrete mixture may include conductive aggregates, such as iron ore and/or slag.

In some instances, copper-rich aggregates can be used. It should be noted that using conductive aggregates may reduce the amount of conductive fibers necessary to maintain stable electrical conductivity. Additionally, a chemical admixture may be added to the aggregate to enhance electrical conductivity and reduce the amount of conductive fibers.

One cubic yard of a conductive concrete mixture in accordance with the present disclosure may be formulated as follows:

TABLE 1

| Material | Pounds | Percent |
| --- | --- | --- |
| Hydraulic cement | 707 | 16.7% |
| Silica fume | 41 | 0.9% |
| Taconite sand (2 mm max particle size) | 1023 | 24.1% |
| Taconite coarse aggregate (25 mm max particle size) | 1125 | 26.5% |
| Carbon powder (0.5 mm max particle size) | 121 | 2.9% |
| Carbon particles (10 mm max particle size) | 509 | 12.0% |
| Water | 422 | 10.0% |
| Steel fiber (1 in.) | 122 | 2.9% |
| Steel fiber (1.5 in.) | 100 | 2.3% |
| Steel fiber (fine)/steel shavings | 75 | 1.8% |

A conductive concrete mixture formulated as described may have mechanical strength characteristics such as a twenty-eight (28) day compressive strength ranging from about four thousand five hundred pounds per square inch (4,500 psi) to seven thousand pounds per square inch (7,000 psi), and a flexural strength ranging from about eight hundred pounds per square inch (800 psi) to one thousand five hundred pounds per square inch (1,500 psi). The purity of the conductive carbon particles and graphite particles may be at least approximately ninety-six percent (96%). It should be noted that coke breeze (a product from coal mines with about eighty percent (80%) fixed carbon) may be used in place of and/or in addition to high purity carbon. For example, the conductive concrete mixture described with reference to the table above may be formulated using about six hundred and thirty pounds (630 lbs.) of coke breeze or about 14.9% of the conductive concrete mixture by weight. It should also be noted that the specific amounts described above are provided by way of example only and are not meant to limit the present disclosure. Thus, other amounts of material may be used for a specified shielding effectiveness (SE) in accordance with the present disclosure.

The conductive carbon particles can include carbon particles present in varying ratios. The purity of the carbon particles and powder may also vary from 50% to 100%. For example, the conductive carbon particles can include one or more of carbon particles, carbon powder, coke breeze, or the like. The purity of the conductive carbon particles and powder should be at least eighty percent (80%). It should be noted that the specific amounts described above are provided by way of example only and are not meant to be restrictive of the present disclosure. Thus, other amounts of material and/or additional materials may be used for a specified conductive concrete mixture in accordance with the present disclosure. For example, the conductive concrete mixtures can also include, but are not limited to, one or more of a retarding mixture (e.g., an ASTM C494 Type D admixture, hydration stabilizer, etc.) and a superplasticizer (e.g., an ASTM C494 Type A and F admixture, an ASTM C1017 Type I admixture, a water-reducing admixture, etc.).

Cement may be present in the mixture in an amount from about twelve to about eighteen percent (12-18%) of the conductive concrete mixture by weight; silica fume may be present in the mixture in an amount from about one-tenth to one and about one-tenths percent (0.1-1.1%) of the conductive concrete mixture by weight; slag may be present in the mixture in an amount up to about six percent (6%) of the conductive concrete mixture; aggregate may be present in the mixture in an amount from about twenty to about thirty percent (20-30%) of the conductive concrete mixture by weight; sand (e.g., coarse sand) may be present in the mixture in an amount from about twenty to twenty-five percent (20-25%) of the conductive concrete mixture by weight; conductive carbon material (e.g., carbon particles, carbon powder, and coke breeze, which can be present in varying ratios) may be present in the mixture in an amount from about ten to about twenty percent (10-20%) of the conductive concrete mixture by weight; water may be present in the mixture in an amount from about five to about fifteen percent (5-15%) of the conductive concrete mixture by weight; and additive steel portions (e.g., steel fibers, steel wool, steel shavings, which can be present in varying ratios) may be present in the mixture in an amount from about one-tenth to about fifteen percent (0.1-15%) of the conductive concrete mixture by weight.

Further, the amounts of materials having different particle sizes may vary as well. For example, in implementations, conductive carbon particles may be present in the mixture in an amount up to about fifteen percent (15%) of the conductive concrete mixture by weight; conductive carbon powder may be present in the mixture in an amount up to about three percent (3%) of the conductive concrete mixture by weight; coke breeze may be present in the mixture in an amount from about five to about twenty percent (5-20%) of the conductive concrete mixture by weight; 25.4 millimeters (one inch (1 in.)) long steel fibers may be present in the mixture in an amount from about two and one-half to about four percent (2.5-4%) of the conductive concrete mixture by weight; 38.1 millimeters (one-half inch (1.5 in.)) long steel fibers may be present in the mixture in an amount from about one to about four percent (1-4%) of the conductive concrete mixture by weight; and fine steel fiber (e.g., steel powder, steel wool, steel shavings, etc.) may be present in the mixture in an amount from about one and one-half to about four and one-half percent (1.5-4.5%) of the conductive concrete mixture by weight.

Referring back to FIG. 1, the electrical filter 100 includes a first side 106 and a second side 108. As shown, the first side 106 includes the portions of electrical cables 104-1, 104-2, 104-3 that receive an electrical signal. The conductive concrete structure 102 attenuates the electrical signal, and the second side 108 includes the portions of the electrical cables 104-1, 104-2, 104-3 that outputs an electrical signal having attenuated characteristics. The electrical signal is attenuated due to energy absorption characteristics of the conductive concrete structure 102. For example, for a line attenuation of 1 dB per inch, a 5-ft filter can reduce the input pulse by 60 dB (or, a factor of 1,000). This type of lossy filter can modify a short current pulse of 2.5 kAmps peak at the input to less than 2.5 Amps peak at the output.

In various implementations, the electrical conductivity of the conductive concrete structure 102 is greater than about 0.5 siemens per meter (S/m). More specifically, the electrical conductivity of the conductive concrete structure 102 ranges from about 0.5 S/m to about 5 S/m. Conductivity may be calculated as simply the inverse of resistivity. Electrical resistivity or conductivity may be measured using a two-point uniaxial method or a four-point (Wenner probe) method. As an example, resistivity may be measured according to American Association of State Highway and Transportation Officials (AASHTO) Test Procedure (TP) 95.

The electrical filter 100 includes a conduit 110 disposed within the conductive concrete structure 102 to receive a non-empty set of the electrical cables 104. In other words, the conduit 110 includes at least one of the electrical cables 104. In the example shown in FIG. 1, the electrical cable 104-1 is received within the conduit 110. However, the electrical filter 100 may include additional conduits or no conduits at all. The conduit 110 reduces or eliminates physical contact between the electrical cables and the concrete mixture. This may prevent undesired chemical reactions from occurring between the concrete mixture and sheathing of the electrical cable 104-1. Additionally or alternatively, the conduit 110 may reduce stress on the electrical cable 104-1 as the concrete mixture is introduced (such as by pouring). In some implementations, the conduit 110 may include ambient air, sealant materials, additional attenuation materials, or the like. The conduit 110 may include a polyvinyl chloride (PVC) pipe, a metal conduit, etc.

The electrical filter 100 may include various electrical cable and/or conduit configurations. For example, the electrical filter 100 may include a straight electrical cable 104. The conduit material type and length of the electrical cable may be selected based upon the types of signals provided through the electrical cable. In some instances, a straight cable may be arranged in the PVC conduit, and another straight cable may be arranged in the metal conduit. In yet another instance, a cable having one or more inductive coils may be arranged in the PVC conduit, and a straight cable may be arranged in the metal conduit, or vice versa.

Figure 2:
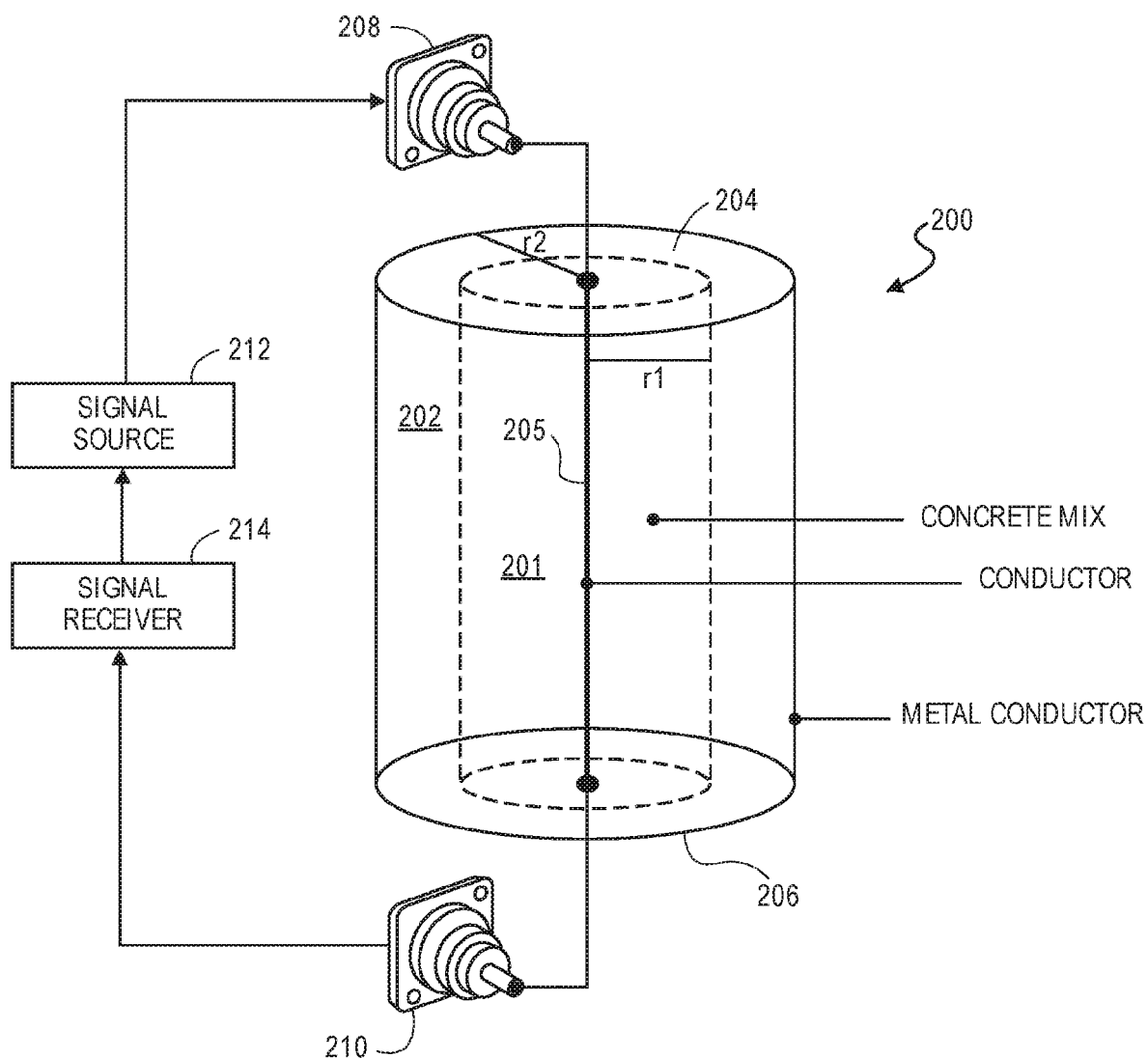
FIG. 2 is a diagrammatical illustration of the filter in accordance with example implementations of the present disclosure.

FIG. 2 illustrates an electrical filter 200 according to an example implementation of the present disclosure. For instance, the electrical filter 200 may act as a transmission line filter. The transmission line filter was cast to evaluate the absorption characteristics of the filter. The transmission line filter includes the conductive concrete structure 201 and a metal conductor structure 202 encasing the conductive concrete structure 201. The metal conductor structure 202 includes the conductive concrete structure 201 therein. The electrical filter 200 can also include first and second metal endcaps 204, 206 fixedly attached to the metal conductor structure 202 to completely encase the conductive concrete structure 102. The endcaps 204, 206 can also include corresponding connectors 208, 210 that connect with the one or more electrical cables 205. The connectors 208, 210 can be fixedly attached to the corresponding endcap 204, 206. In some examples, the connectors 208, 210 may be soldered to the electrical cables 205. In some implementations, the connectors 208, 210 are type-N RF connectors. A signal source 212 provides signals to the electrical filter 200, and a signal receiver 214 receives an attenuated signal. The signal source 212 may be a voltage source, such as a battery or the like. In some implementations, the signal source 212 and the signal receiver 214 may be a network analyzer.

A current pulse I(t) propagating down an electrical filter of length L would be attenuated due to insertion loss according to:

$$I(t, L) = I_0\left(t - \frac{L}{v}\right)e^{-\alpha L} \quad \text{EQ. 1}$$

where $\alpha$ is a loss coefficient (m−1) of the electrical cable and $v$ is a propagation velocity (m/s) of the electrical cable, and $I_o(t)$ is the current pulse.

The frequency response of the concrete filter of length L can be calculated according to:

$$H(j\omega) = e^{-j\omega L/v}e^{-\alpha L|\omega|} = e^{-j\omega T}e^{-|\omega|/b} = e^{-j\omega T}e^{-|f|/\left(\frac{b}{2\pi}\right)} \quad \text{EQ. 2}$$

where $T=L/v$ is the propagation or group delay, a is attenuation coefficient density (m$^{-1}$/rad/s), aL is the attenuation coefficient (per rad/s), b=1/aL (rad/s) is the angular frequency scaling parameter, and $\alpha=a\omega$. For the above coaxial sample, T=6 ns, and b/2$\pi$ corresponds to an insertion loss of 54 dB at f=1 GHz:

$$-54 = 20\log\left(e^{-1 \, GHz\left(\frac{b}{2\pi}\right)}\right) = -1 \text{ GHz} \Big/ \left(\frac{b}{2\pi}\right)(8.7) \quad \text{EQ. 3}$$

$$b = 2\pi(1 \text{ GHz})\left(\frac{8.7}{54}\right) = 2\pi(0.161 \times 10^9 \text{ Hz}) \approx 1.0 \times 10^9 \text{ rad/s}$$

Note that the amplitude response $$H_A(j\omega) = e^{-\frac{|\omega|}{b}}$$

is related to the Laplacian distribution $$\frac{1}{2b}e^{-|\omega|/b}.$$

The impulse response can be obtained via the inverse Fourier transform:

$$h_A(t) = \frac{b/\pi}{1 + b^2 t^2} \quad \text{EQ. 4}$$

The impulse response of the electrical filter 100 is the time delay of $h_A(t)$:

$$h(t) = h_A(t - T) = \frac{b/\pi}{1 + b^2(t - T)^2} \quad \text{EQ. 5}$$

Figure 3:
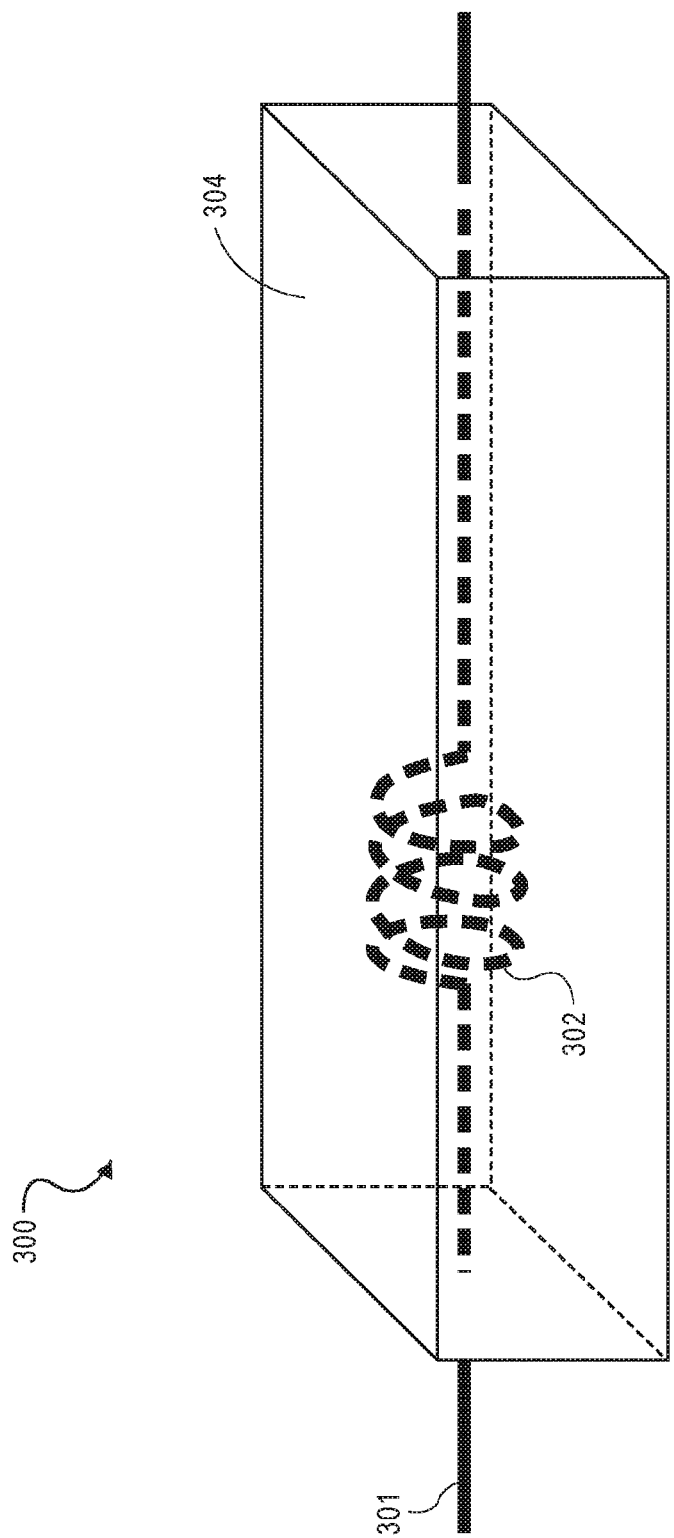
FIG. 3 is a diagrammatical illustration of another filter according to an example implementation of the present disclosure.

FIG. 3 illustrates another implementation of an electrical filter 300. In this implementation, one or more electrical cables can be configured as an inductive coil to effectively increase the cable length and/or inductance of the electrical filter 300. For instance, the electrical cable 301 includes inductive coiling 302 within the conductive concrete structure 304. In other implementations, the conductive concrete structure 304 can be combined with the TEMPEST/HEMP filter for reduced requirements on the filter insertion loss and potentially eliminating the MOV. The electrical filter 300 can also be used to perform filtering of high voltage lines directly to simplify the filtering at the power distribution output following the high voltage transformers in electrical power substations. It is understood that electrical cables 301 having inductive coiling 302 may be disposed within one or more conduits, such as the conduit 110 described above.

The electrical filter 300 uses the RF absorption characteristics of conductive concrete to perform filtering of electrical signals input to the electrical filter 300. The electrical filter 300 functions as a lossy filter constructed from encasing electrical cables and wires in a conductive concrete structure. RF signals can be received at the electrical filter 300 and are absorbed by the surrounding conductive concrete medium such that the high frequency signals are heavily attenuated along the electrical cables.

A coaxial cylinder filter that is 18-in long and 4-in diameter has been shown to achieve 54 dB at 1 GHz. The pulse response shows a 3 dB and 30 dB attenuation of a 12 ns pulse and 1 ns pulse, respectively. The insertion loss of the filter in dB is linear with frequency, demonstrating the expected loss characteristics versus frequency as expected for a lossy filter based on absorption. In some examples, the length of the conductive concrete structure 102 may range from about ten feet (10 ft.) to about twenty feet (20 ft.). However, other lengths may be utilized depending on the configuration of electronic devices to be protected.

The RF characteristics of the coaxial sample were measured with a network analyzer from 300 kHz to 3 GHz. The coaxial transmission line filter functioned as a lossy transmission line. The constant group delay of approximately 6 ns over the 18-in long cylinder corresponds to a propagation velocity of about 3 in/ns or about 7.5 cm/ns which is roughly ¼ of the free space velocity of 30 cm/ns.

Insertion loss can increase linearly with frequency, reflecting the absorption characteristics of the conductive concrete mix. For instance, an attenuation of about 54 dB at 1 GHz or 0.054 dB/MHz can be achieved. When using an 18-in long cylinder, this corresponds to a characteristic loss coefficient of 0.036 dB/ft/MHz or about 0.12 dB/m/MHz. A 10-ft long, 4-in diameter filter would reach 360 dB attenuation at 1 GHz or 36 dB at 100 MHz, with the insertion loss expected to increase further with a wider and a longer electrical filter.

Insertion loss measurements occurring from 300 kHz to 3 GHz indicate that a RG-58 coaxial cable is completely isolated against the concrete and the electrical cable inside the metal conduit is shielded from the concrete. Some measurements have illustrated that an electrical filter performs better with direct cable burials that enhance absorption and inductive load cables that improve low frequency attenuation.

Broadband insertion loss measurement results occurring within the frequency range of 10 kHz to 8.5 GHz indicated that the filter attenuation for directly buried cables is below the instrument noise floor above 500 MHz compared to 2.5 GHz for the cable in the PVC conduit. Additionally, measurement results over the MIL-STD-188-125 within the frequency range of 10 kHz to 1 GHz indicated that attenuation is greater than 100 dB above 100 MHz with an inductive cable and 200 MHz with a straight cable. A 50 dB attenuation at 10 MHz for the inductive cable suggests that the electrical filter should achieve attenuation better than 100 dB above 10 MHz with a 20-ft trench. The results also illustrate that filtering below 10 MHz should be supplemented with a low frequency filter.

Further measurements have indicated that the inductive load cable exceeds 80 dB above 60 MHz and the straight wire exceeds 80 dB above 140 MHz. Thus, with proper inductive loading, the electrical filter can meet the low frequency requirements. For example, the inductive load cable may have a single-pole corner frequency of about 100 kHz. Additional inductive loading could lower the corner frequency to 1 kHz.

Figure 5:
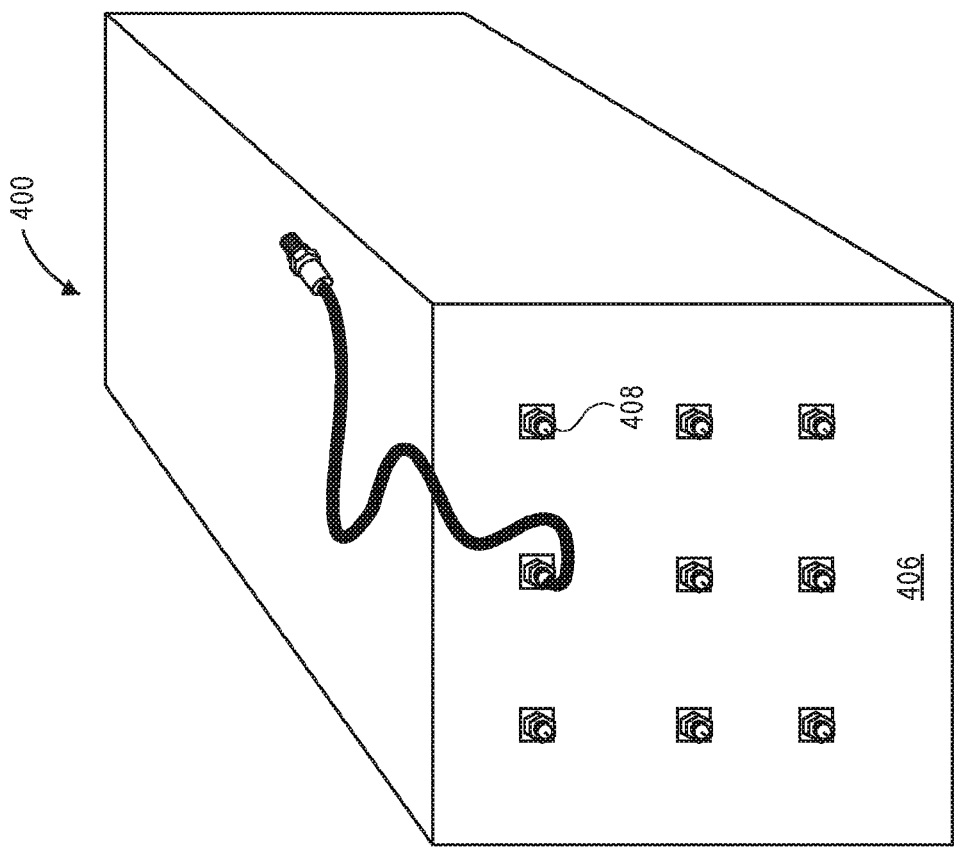
FIGS. 4 and 5 are diagrammatical illustrations of an example filter in accordance with an example implementation of the present disclosure.
Figure 4:
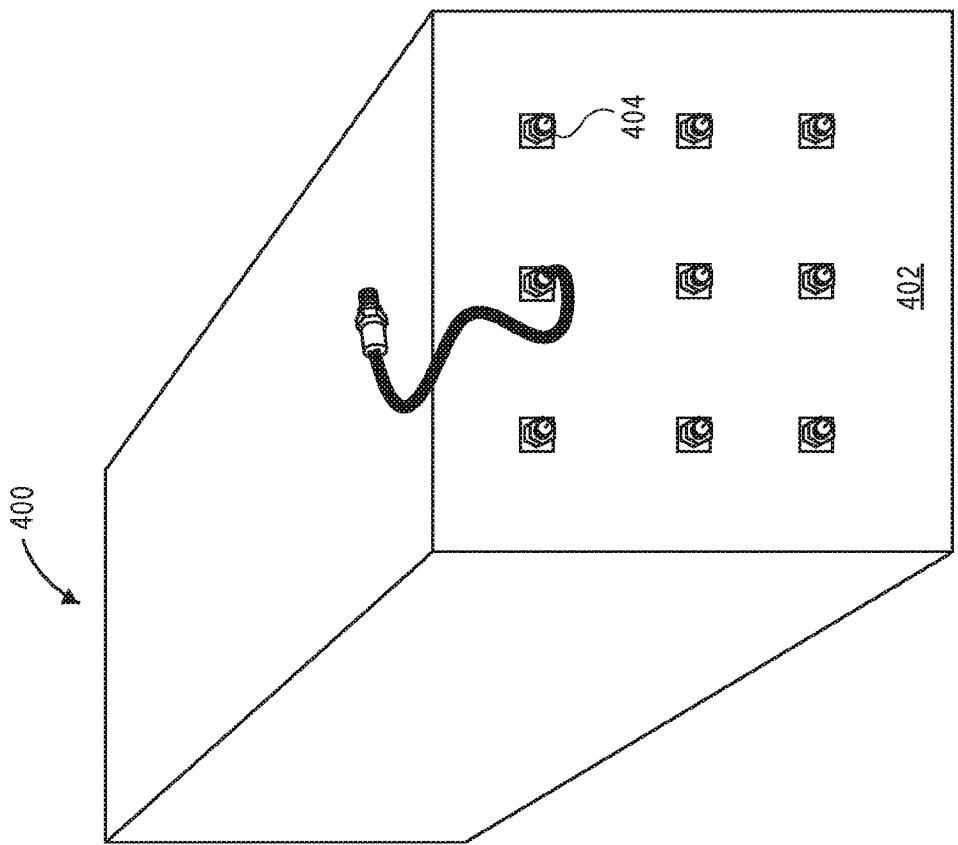

FIGS. 4 and 5 illustrate an example electrical filter 400 according to an example implementation of the present disclosure. For example, FIG. 4 illustrates a first side 402 of the electrical filter 400 having multiple input connectors 404, and FIG. 5 illustrates a second side 406 of the electrical filter 400 having multiple output connectors 408. The connectors 404, 408 can connect to electrical cables, electronic devices, and the like.

Figure 6:
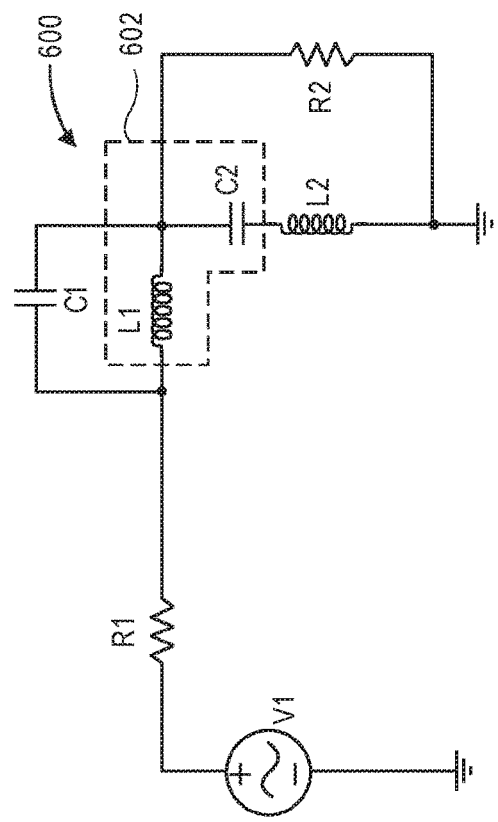
FIG. 6 is a circuit schematic of a circuit that does not employ the filter.
Figure 7:
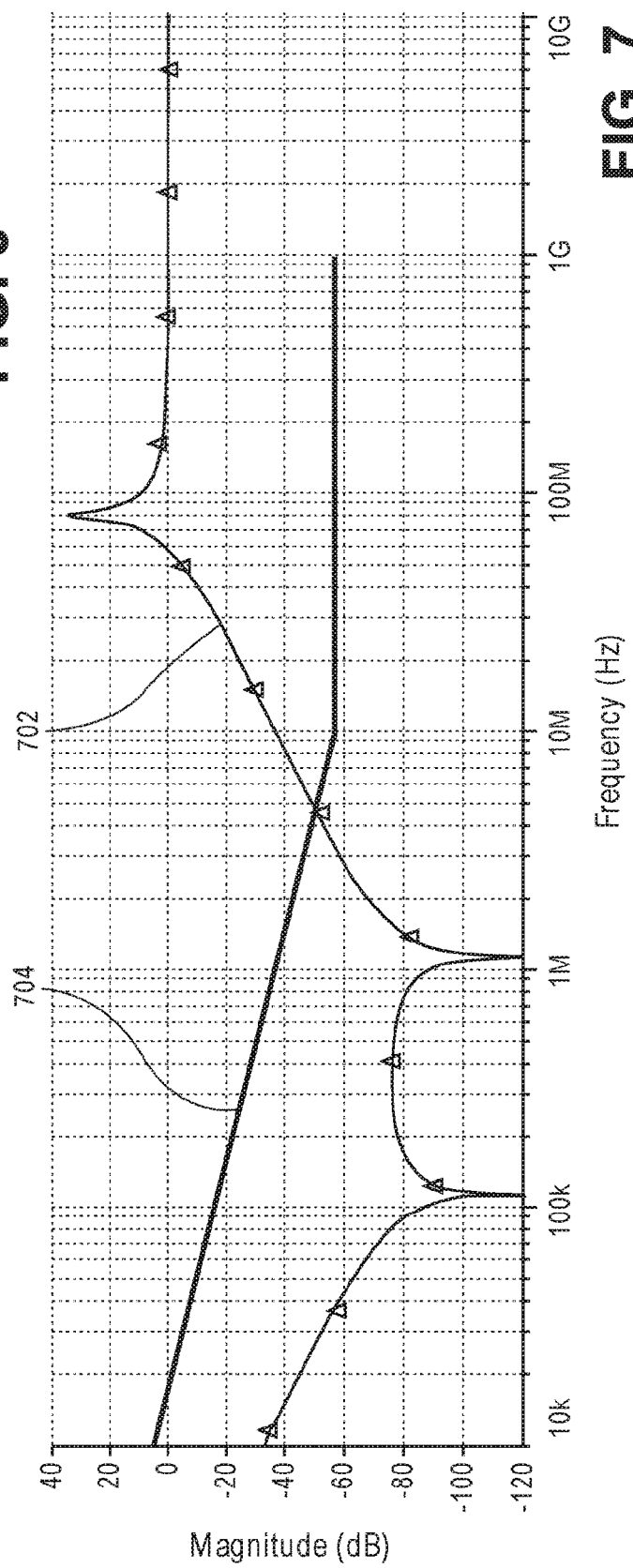
FIG. 7 is a plot of magnitude of an electrical signal over a frequency range for the circuit shown in FIG. 6.

FIG. 6 is a schematic diagram of a low-frequency filter 600 that does not include the electrical filter. The low-frequency filter includes a voltage source V1, a low-frequency filter 602, and a load resistor R2. The resistor R1 represents a resistance within the low-frequency filter 600 and capacitor C1 and inductor L2 represent parasitic components. FIG. 7 illustrates a magnitude response 702 of a signal output by the low-frequency filter 600 with respect to MIL-STD-188-125-1 attenuation requirements 704. For instance, FIG. 7 illustrates that the low-frequency filter 602 network may result in poor high-frequency attenuation above 1 MHz due to the resonances associated with L1 and C2, which may be due to the parasitic components C1 and L2.

Figure 8:
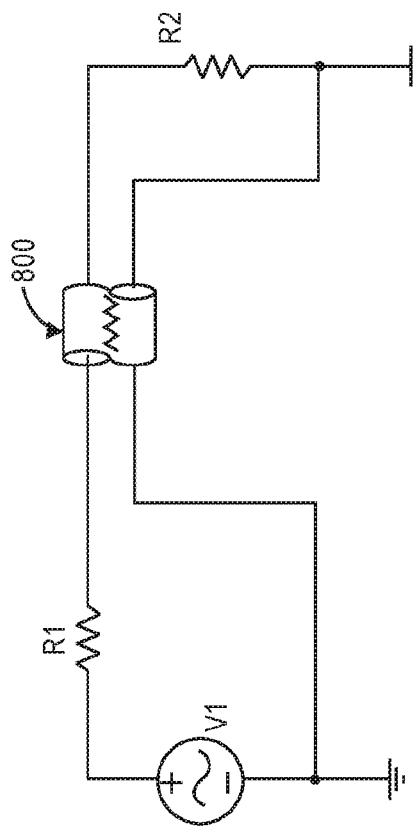
FIG. 8 is a circuit schematic of a circuit employing the filter in accordance with an example implementation of the present disclosure.
Figure 9:
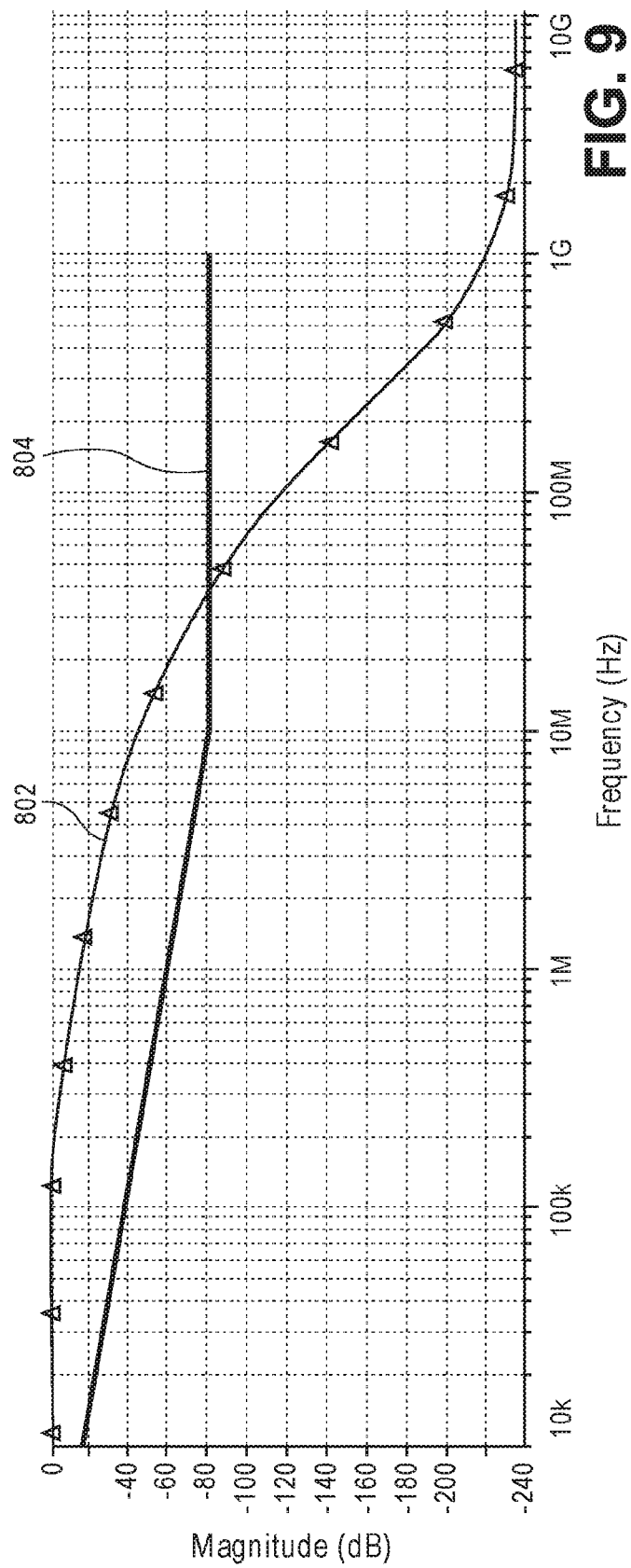
FIG. 9 is a plot of magnitude of an electrical signal over a frequency range for the circuit shown in FIG. 8.
Figure 10:
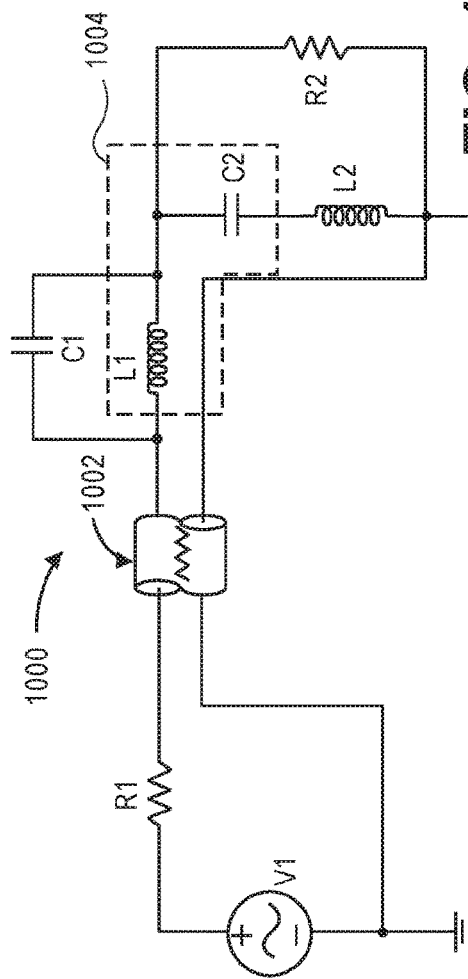
FIG. 10 is a circuit schematic of a circuit employing the filter and another low-pass filter in accordance with an example implementation of the present disclosure.
Figure 11:
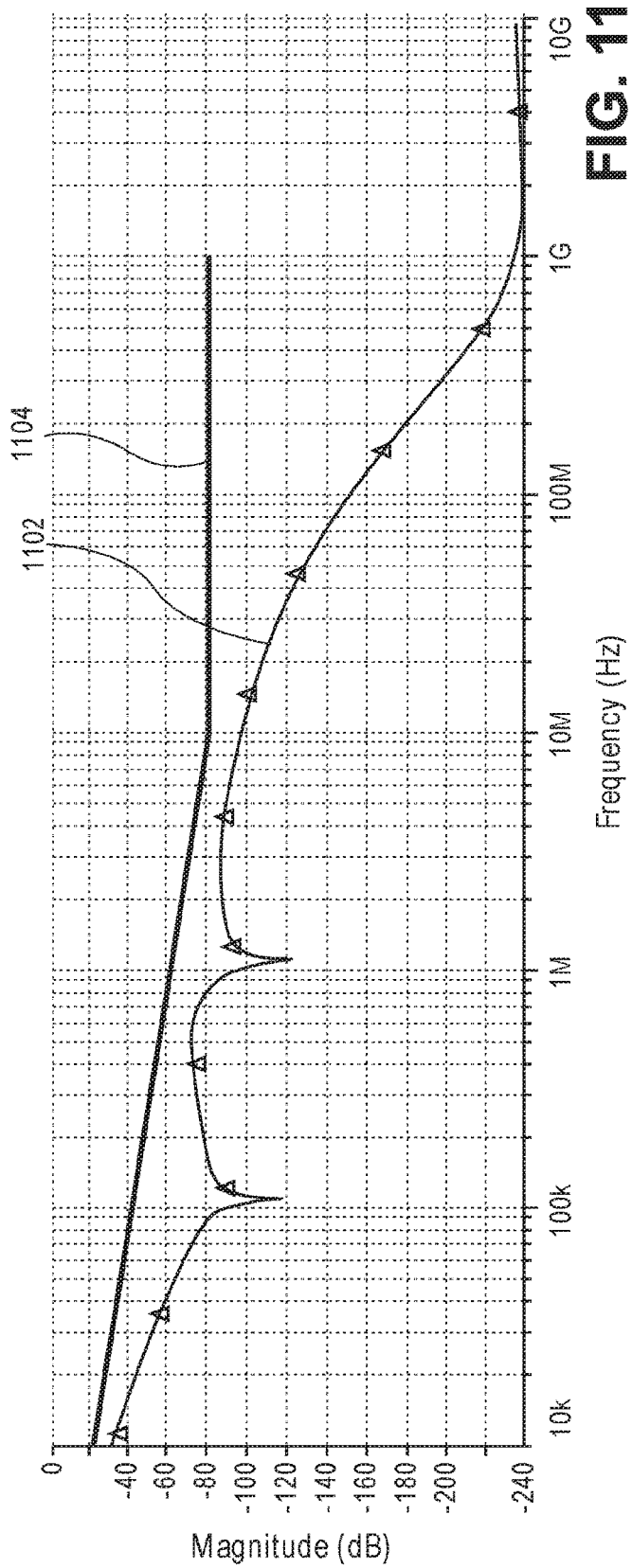
FIG. 11 is a plot of magnitude of an electrical signal over a frequency range for the circuit shown in FIG. 10.

FIG. 8 is a schematic diagram of an attenuation circuit in which a lossy transmission line model 800 simulates a concrete filter. The attenuation circuit includes a voltage source V1, a resistor R1 that models a resistance, and a load resistor R2. FIG. 9 illustrates simulation results showing that the magnitude response 802 may not meet the MIL-STD attenuation requirement 804 (which is a frequency-dependent upper limit) at frequencies below 40 MHz. FIG. 10 is a schematic diagram of an attenuation circuit 1000 including an electrical filter 1002 in series with resistor R1 and a discrete low-frequency filter 1004 including L1 and C2. The capacitor C1 and inductor L2 represent parasitic components, and R2 is a load resistor. As shown in FIG. 11, the magnitude response 1102 illustrates that the attenuation circuit 1000 including the electrical filter 1002 in series with the low-frequency filter 1002 exceeds the MIL-STD requirements 1104.

Figure 12:
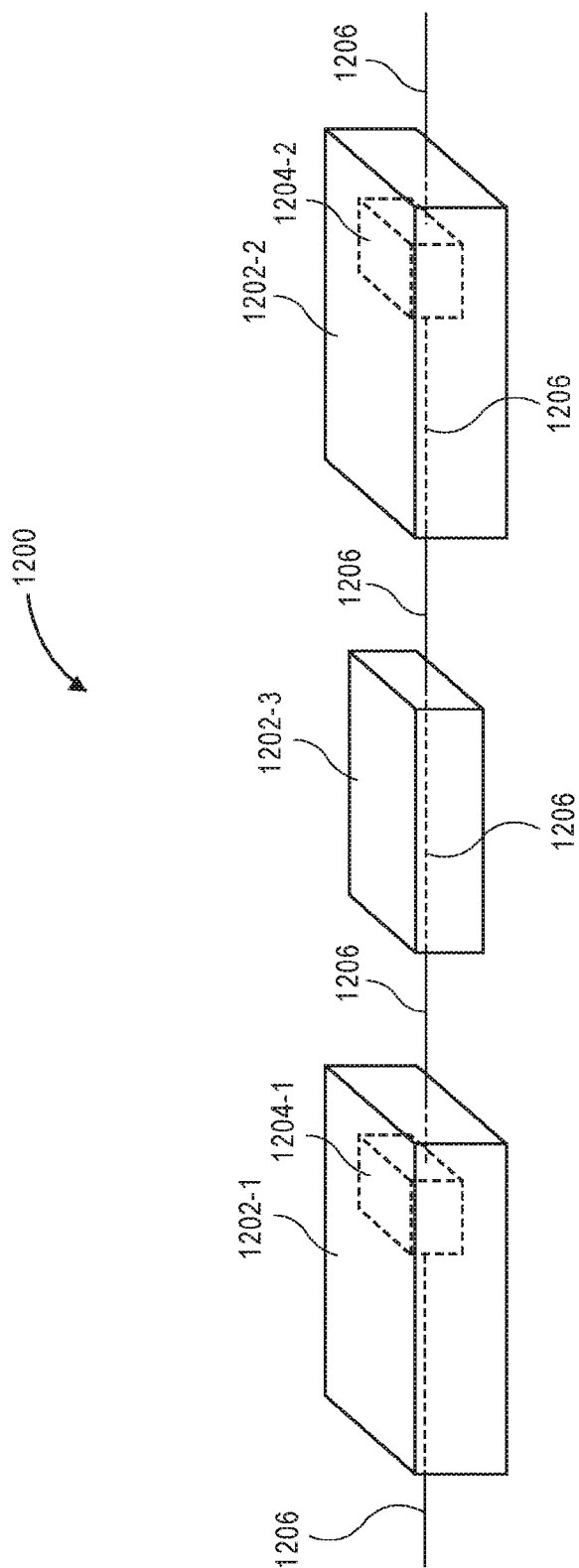
FIG. 12 is a diagrammatical illustration of a system including multiple filters in accordance with an example implementation of the present disclosure.

FIG. 12 illustrates an example system 1200 including one or more EMP structures and one or more electrical filters, which are illustrated as EMP structures 1202-1, 1202-2 and electrical filter 1202-3 (collectively, EMP structures 1202). The EMP structures 1202-1, 1202-2 may fully or partially enclose electronic devices 1204-1, 1204-2, respectively (collectively, electronic devices 1204). For example, the EMP structures 1202-1, 1202-2 may enclose the sides and top of the electronic devices 1204, while the bottom of the electronic devices 1204 are enclosed by the ground and, some examples, standard concrete. For example, the EMP structures 1202-1, 1202-2 may be dome-shaped structures. The EMP structures 1202-1, 1202-2 may protect the electronic devices 1204 from energy generated by an EMP event. In an example implementation, the EMP structures 1202 may each be constructed from a conductive concrete mixture, such as that specified above.

As shown, the system 1200 includes a first EMP structure 1202-1 including a first electronic device 1204-1, a second EMP structure 1202-2 including a second electronic device 1204-2, and an electrical filter 1202-3 that connects the first electronic device 1204-1 to the second electronic device 1204-2 by an electrical cable 1206. It is understood that the electrical cable 1206 may be the same electrical cable or multiple electrical cables connected together. Additionally, it is understood that the system 1200 can include more or fewer EMP structures, electrical filters, and/or electronic devices. The electronic devices can include any type of electronic device, such as transformers, computing devices, routers, and the like.

Figure 13:
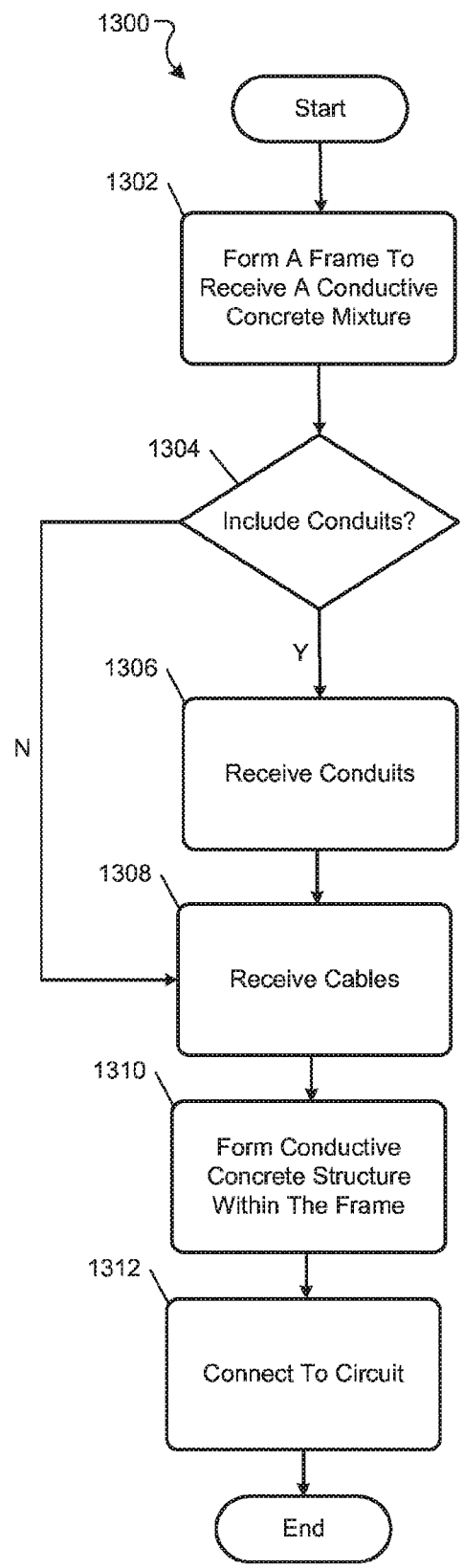
FIG. 13 is an example flow diagram illustrating a method for constructing the filter in accordance with an example implementation of the present disclosure.

FIG. 13 illustrates an example method 1300 for constructing the electrical filter 100. At 1302, a frame is formed to receive a conductive concrete mixture. In various examples, a trench can be formed within the ground to receive the conductive concrete mixture. In other examples, a hollow structure is obtained to receive the conductive concrete mixture. At 1304, a determination is made whether to include conduits in the electrical filter. If conduits are to be included, conduits are received in the frame at 1306. If conduits are not to be included, electrical cables are received in the frame at 1308. At 1310, a conductive concrete structure is formed within the frame. For example, the conductive concrete mixture is poured into the frame to form the conductive concrete structure. At 1312, the electrical filter is connected to a circuit, such as a network analyzer, voltage source, load, or the like. In some implementations, the conductive concrete mixture can be poured into the frame.

"About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

What is claimed is:

1. An electrical filter comprising:
   a concrete structure comprising conductive concrete, the conductive concrete including a conductive carbon material, a magnetic material, and a conductive metallic material, the conductive concrete structure is characterized by an electrical conductivity greater than 0.5 siemens per meter; and
   at least one electrical cable having inductive coiling and being disposed within the conductive concrete structure, wherein the at least one electrical cable includes an input to receive an electrical signal and an output to output an attenuated electrical signal.

2. The electrical filter of claim 1, wherein the concrete structure is characterized by attenuation characteristics including a length of the concrete structure, an attenuation coefficient of the concrete structure, and an attenuation coefficient density of the concrete structure.

3. The electrical filter of claim 2, wherein the one or more attenuation characteristics are selected such that the electrical signal is attenuated by at least three decibels (3 dB).

4. The electrical filter of claim 1, further comprising a connector disposed on an exterior surface of the concrete structure and configured to connect to the at least one electrical cable.

5. The electrical filter of claim 1, wherein the at least one electrical cable is in direct contact with the concrete structure along an entire length of the at least one electrical cable.

6. The electrical filter of claim 1, further comprising a conduit disposed within the concrete structure, wherein the conduit is configured to receive the at least one electrical cable.

7. The electrical filter of claim 6, wherein the conduit is at least one of a polyvinyl chloride (PVC) pipe and a metal pipe.

8. The electrical filter of claim 1, wherein the electrical conductivity of the concrete structure is in a range from 0.5 siemens per meter to 5 siemens per meter.

9. A system comprising:
   a first electromagnetic pulse structure that at least partially encloses a first electronic device;
   a second electromagnetic pulse structure that at least partially encloses a second electronic device; and
   a lossy electrical filter including:
      a concrete structure formed from a conductive concrete mixture including a conductive carbon material, a magnetic material, and a conductive metallic material, wherein the conductive concrete structure is characterized by an electrical conductivity greater than 0.5 siemens per meter; and at least one electrical cable disposed within the concrete structure, wherein the at least one electrical cable is arranged in at least one loop and includes an input to connect to the first electronic device to receive an electrical signal and an output to connect to the second electronic device to output an attenuated electrical signal produced by the absorptive characteristics of the conductive concrete.

10. The system of claim 9, wherein:

the first electromagnetic pulse structure is formed from the conductive concrete mixture, and the second electromagnetic pulse structure is formed from the conductive concrete mixture.

11. The system of claim 9, wherein the first electronic device comprises at least one of a transformer and a server.

12. The system of claim 9, wherein the electrical conductivity of the concrete structure is in a range from 0.5 siemens per meter to 5 siemens per meter.

* * * * *